United States Patent [19]

Smids

[11] 4,165,947

[45] Aug. 28, 1979

[54] CUTTING TOOL

[75] Inventor: Rune Smids, Nossebro, Sweden

[73] Assignee: Sandvik Aktiebolag, Sandviken, Sweden

[21] Appl. No.: 874,242

[22] Filed: Feb. 1, 1978

[51] Int. Cl.$^2$ .............................................. B26D 1/12
[52] U.S. Cl. ........................................ 407/46; 407/101
[58] Field of Search ....................... 407/36, 37, 38, 39, 407/44, 45, 46, 88, 89, 101

[56] References Cited

U.S. PATENT DOCUMENTS

| | | | |
|---|---|---|---|
| 457,213 | 8/1891 | Rettiger | 407/45 |
| 650,013 | 5/1900 | Huther | 407/45 |
| 3,289,273 | 12/1966 | Artaud | 407/101 |
| 3,839,772 | 10/1974 | Shimomura et al. | 407/36 |
| 3,914,841 | 10/1975 | Borgardt | 407/90 |
| 4,043,697 | 8/1977 | Eckle | 407/45 |
| 4,083,644 | 4/1978 | Friedline | 407/101 |

Primary Examiner—Harrison L. Hinson
Attorney, Agent, or Firm—Burns, Doane, Swecker & Mathis

[57] ABSTRACT

A cutting tool that has a body with an insert receiving a pocket at an extremity thereof and an insert on a support body which has surfaces complementary to support surfaces of the tool body and seated in the pocket. A cylindrical locking member is received in a bore that extends parallel to the pocket and a locking screw extends through the support body and through an open ended slot that joins the pocket and the bore and threadedly engages the locking member in such a manner that when the locking screw is tightened the insert and support member are locked into the tool body pocket and when the screw is loosened the insert, the support body, the locking screw, and the locking member can be removed from the tool body by sliding the same from the open ended slot.

7 Claims, 8 Drawing Figures

CUTTING TOOL

BACKGROUND AND OBJECTS OF THE INVENTION

The present invention relates to a cutting tool comprising a tool body and an insert-provided support body, said support body being mechanically secured in a pocket in the tool body.

Various milling cutters exist in which the cutting inserts are exchangeable and indexable. Common types of inserts used in milling cutters are centrally apertured for the reception of a locking screw thereinto. When indexing the insert to provide a new cutting edge it is necessary to loosen the screw to such extent that the edge supporting surface or surfaces of the insert are free from engagement. The procedure of having all inserts of a milling cutter loosened and tightened for every change of insert is time consuming and, hence, causes loss of production in particular when a change of cutting edge must be effected without being able to loosen the milling cutter from its machine spindle. Further, with large diameter milling cutters the accessibility is limited to such extent that it is often impossible to adequately engage an Allen Key with the locking screws of the centrally apertured inserts.

For the above reasons it is a requirement to provide a cutting tool with which an insert and its support body is easily detachable and exchangeable as one unit. Such a solution is also needful from another aspect. With the use of round inserts for instance it is always very time consumable to have the insert accurately indexed so as to provide a new cutting edge which causes problems to the operator since the inserts have usually an appreciable temperature after cutting work. A technical solution providing for detachment of insert and support body as one unit should eliminate such problem.

It is an object of the present invention to provide a simple as well as effective solution of above related and other problems relating to cutting tools with clamped inserts.

It is another object of the invention to provide a novel cutting tool in which the insert-carrying support body can be removed from the tool body by merely loosening the retaining screw, rather than completely removing such screw.

It is yet another object of the invention to provide a novel cutting tool in which an open-ended slot is provided in either the tool body or the support body to enable the support body to be removed upon loosening of the retaining screw.

BRIEF SUMMARY OF THE INVENTION

In the milling cutter of the present invention the cutting tool comprises a tool body having a pocket provided therein to receive a support body having a cutting insert at one extremity thereof. The pocket presents abutments surfaces arranged for abutment with complementary support surfaces of the support body. Holding means in the shape of a locking screw extends through the support body while threadably engaging the tool body. The invention is characterized in that the locking screw is received through an open-ended slot that is provided in either the tool body or the support body such that the support body is detachable from said tool body upon loosening of the screw.

THE DRAWING

The invention will now be described more specifically below, with reference to the accompanying drawings showing some preferred embodiments of the invention, in which:

FIG. 1 is a sectional view of a milling cutter embodiment of the invention, taken on line I—I in FIG. 2, FIG. 2 is a view from the underneath side of the milling cutter shown in FIG. 1, FIG. 3 is a perspective view of an insert-carrying support body mountable within a cutting tool as shown in FIGS. 1-2, FIG. 4 is a front view of a cutting tool holder according to another embodiment of the invention, FIG. 5 is a sectional view similar to FIG. 1 of an alternative milling cutter embodiment of the invention, FIG. 6 is a view from the underneath side of the milling cutter shown in FIG. 5, FIG. 7 is a perspective view of the support body of FIGS. 5 and 6, and FIG. 8 is a perspective view of another form of support body to be secured to a cutting tool of FIGS. 5 and 6.

DETAILED DESCRIPTION OF THE PREFERRED EMBODIMENTS OF THE INVENTION

Figure 1:
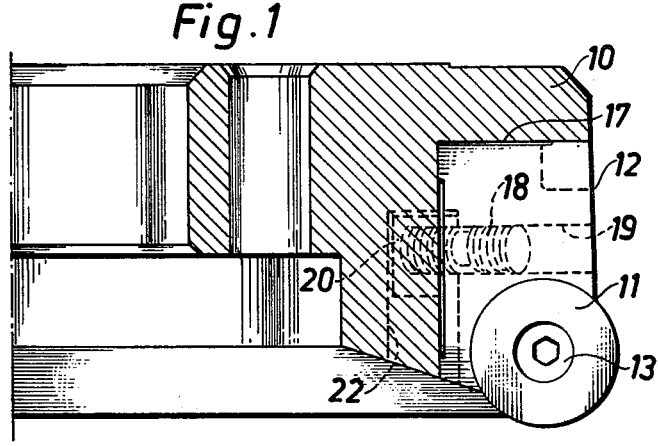
Figure 2:
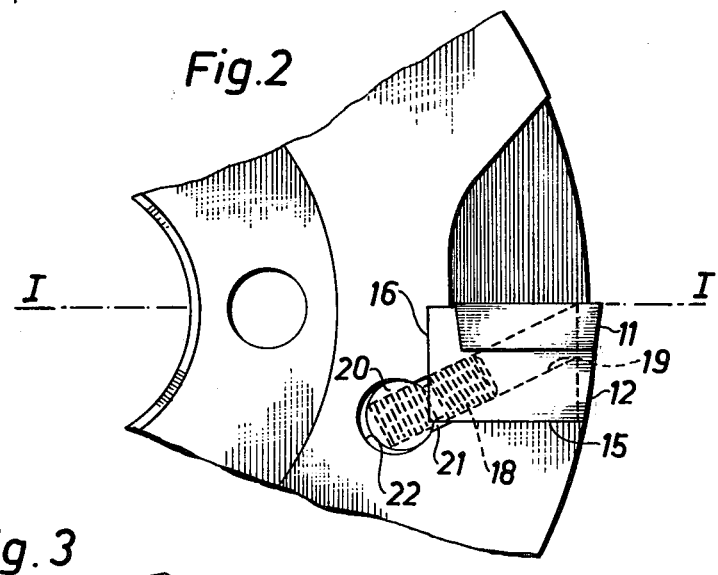
Figure 3:
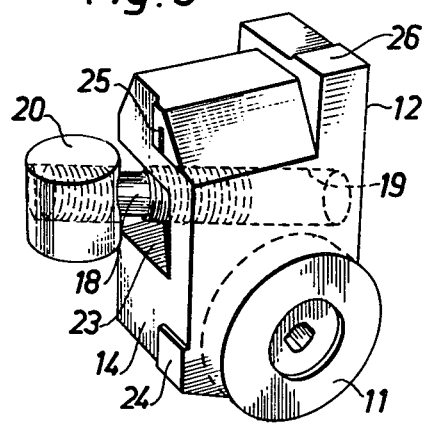

Referring to FIGS. 1-3 a milling cutter body 10 is provided with equally spaced slots around its circumference for the reception of support bodies 12 upon which cutting inserts 11 are located, only one of which is shown in the drawings. Each insert 11 is centrally apertured to receive a locking screw 13 received in said support body 12. Other kinds of locking means for the insert may alternatively be applied. The embodiment shown in the drawings comprises inserts of round shape but it is to be understood that the invention also is useful with other conventional types of inserts.

The support body 12 shown comprises two side surfaces meeting at a right angle, only one of which being visibile in FIG. 3 and indicated at 14. The said two side surfaces are adapted to rest against two complementary support surfaces, indicated as 15 and 16 in FIG. 2. The support body 12 is adapted to additionally rest against an axial support surface 17 in the milling cutter body 10.

The support body 12 is clamped into the cutter body 10 by means of a screw 18 exteriorly provided with threads for left-hand and right-hand turning, said screw 18 being received in a transverse recess 19 in the support body and threadably engaged with a locking member 20. The arrangement is such that the screw 18 passes through an open-ended axial slot 21 situated in the cutter body between the pocket, which receives the support body 12, and a cylindrical bore 22 that extends parallel with support surfaces 15, 16 to receive the locking member 20 in such fashion that the locking member is axially slidable in the bore 22.

The slot 21 extends parallel to the direction of the bore 22 and has its open-end at the outside of the cutter body. The cylindrical bore 22 is also open-ended and terminates at the outside of the cutter body which enables the support body 12, and the locking member 20 to be easily detached as one unit by axial displacement along the slot 21 and the bore 22 upon loosening the screw 18. Thus, it is not necessary to completely remove the screw 18. The locking member 20 is preferably in the shape of a cylindrical swivelling nut but also other configurations thereof may be suitable. The locking member 20 in its clamping condition is received in cylindrical bore 22 and also partially received in a recess 23 in the support body 12.

As is best shown in FIG. 3, the side surface 14 of support body 12 is provided with two-spaced projections 24 and 25 which are planar in shape and adapted to support against support surface 16 in the pocket that receives said support body in the milling cutter body. An additional projection 26 is provided to rest against the axial support surface 17 of said pocket. This arrangement creates good and adequate support of body 12. It is to be understood, however, that other configurations of support body 12 may as well apply.

In the embodiment of a milling cutter shown in FIGS. 1 and 2 both the pocket adapted to receive support body 12 as well as the cylindrical bore 22 extend in the axial direction of the cutter body. The invention is also useful if the pocket and cylindrical bore extend at an angle relative to the central axis of the milling cutter body.

Figure 4:
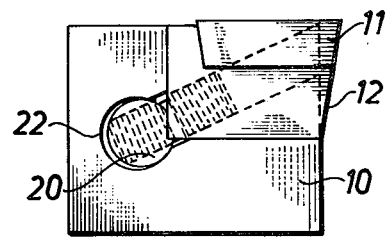
Figure 5:
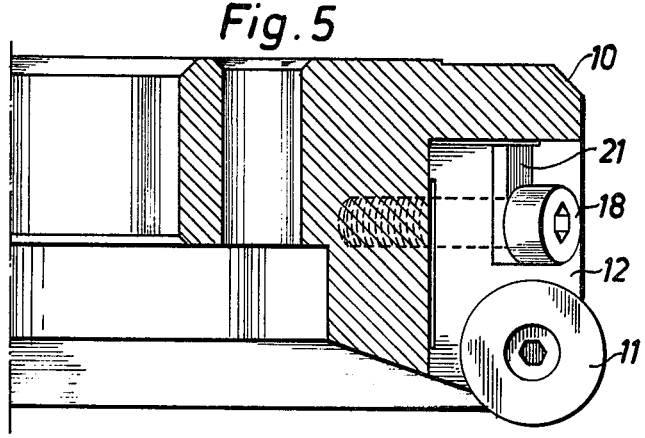
Figure 6:
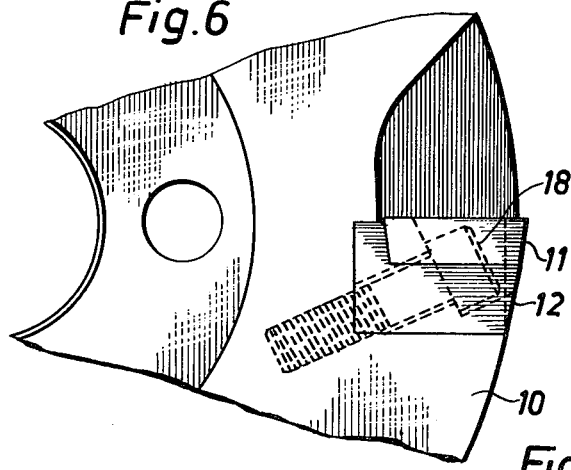
Figure 7:
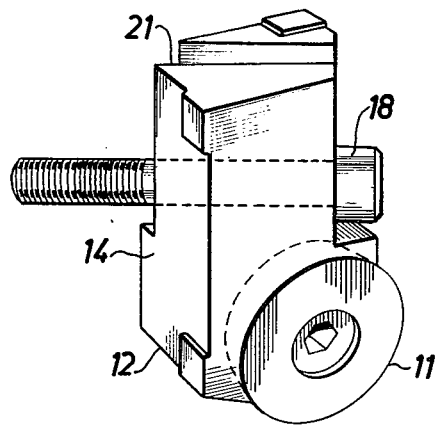

In the embodiment shown in FIG. 4, the invention is applied to an oblong tool holder where the pocket adapted to receive support body 12 and the adjacent cylindrical bore 22 extend substantially in the direction of the tool holder shaft 10.

In FIGS. 5-8 there are shown some alternative embodiments of the invention in which an open-ended slot 21A is provided directly in the support body 12. The slot 21A extends parallel to support surfaces 15 and 16 and terminates at that end surface which is adapted to function as an axial support surface in the cutter body 10. The support body 12 is suitably of parallelepipedic shape and provided with the slot 21A which extends diagonally therethrough. By simply loosening the screw 18A the support body 12 can be removed in a direction perpendicular to the screw due to the presence of the open-ended slot 18A.

Figure 8:
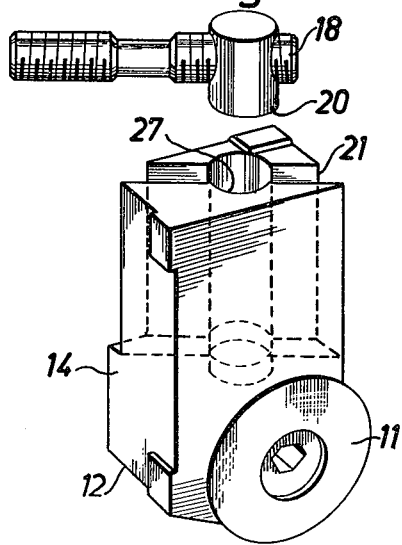

In the embodiment shown in FIG. 8 a slot 21B is provided with an intermediate cylindrically widened portion 27 adapted to receive cylindrical swivelling nut 20B with which the clamping screw 18B is threadably engageable.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A cutting tool comprising:
    a tool body with a pocket to removably receive a support body having a cutting insert at one extremity thereof, said pocket presenting abutment surfaces complementary with support surfaces of said support body,
    a straight cylindrical bore disposed in one of said tool body and said support body while extending parallel to a direction of insertion and removal of said support body,
    a locking member of cylindrical shape displaceable longitudinally in said cylindrical bore, and
    holding means comprising a locking screw extending through said support body and threadably engaging said locking member, said locking screw extending through an open-ended slot which is disposed in said one of said tool body and support body and which terminates at an exterior surface thereof such that the support body is detachable from said tool body merely upon loosening of said screw.

2. Cutting tool as defined in claim 1, wherein said bore and slot are disposed in said tool body.

3. Cutting tool as defined in claim 1, wherein said bore and slot are provided in the support body.

4. Cutting tool as defined in claim 1, wherein the support body is of parallelepipedic shape with said slot extending diagonally therethrough.

5. Cutting tool as defined in claim 1, wherein the cylindrical bore is defined by a cylindrically widened intermediate portion of said slot.

6. Cutting tool as defined in claim 1, wherein the tool body is in the shape of a rotary milling cutter having equally spaced pockets around its circumference for the receipt of insert-carrying support bodies, said pockets extending parallel to the axis of said milling cutter.

7. Cutting tool as defined in claim 1, wherein the tool body is in the shape of an oblong cutting tool holder having a pocket at one end portion thereof for the receipt of said support body, said pocket extending parallel to the axis of said tool holder.

* * * * *